United States Patent

Suganuma et al.

(10) Patent No.: US 11,384,704 B2
(45) Date of Patent: Jul. 12, 2022

(54) INJECTION CONTROL DEVICE

(71) Applicant: DENSO CORPORATION, Kariya (JP)

(72) Inventors: Yohei Suganuma, Kariya (JP); Ryohei Takahashi, Kariya (JP); Hiroyuki Fukuda, Kariya (JP); Masashi Inaba, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/331,212

(22) Filed: May 26, 2021

(65) Prior Publication Data

US 2021/0372338 A1 Dec. 2, 2021

(30) Foreign Application Priority Data

May 28, 2020 (JP) .............................. JP2020-093308

(51) Int. Cl.
*F02D 41/20* (2006.01)
*F02M 51/06* (2006.01)
*F02D 41/24* (2006.01)

(52) U.S. Cl.
CPC ......... *F02D 41/20* (2013.01); *F02D 41/2406* (2013.01); *F02M 51/06* (2013.01); *F02D 2200/0602* (2013.01); *F02D 2200/0606* (2013.01)

(58) Field of Classification Search
CPC ................ F02D 41/20; F02D 41/2406; F02D 2200/0602; F02D 2200/0606; F02M 51/06
See application file for complete search history.

(56) References Cited

U.S. PATENT DOCUMENTS

| | | | | |
|---|---|---|---|---|
| 6,401,703 B1* | 6/2002 | Mamiya | ................ | F02D 31/008 123/295 |
| 2004/0139946 A1* | 7/2004 | Hamada | .................. | F02M 37/20 123/458 |
| 2010/0070159 A1* | 3/2010 | Iwahashi | ............. | F02D 41/2438 701/105 |
| 2010/0180874 A1* | 7/2010 | Iwahashi | ............... | F02D 13/023 123/674 |
| 2011/0073077 A1* | 3/2011 | Yamaguchi | ........... | F02D 41/065 123/491 |
| 2015/0308361 A1* | 10/2015 | Hibira | ................... | F02D 19/061 123/674 |
| 2020/0284214 A1 | 9/2020 | Inaba et al. | | |
| 2020/0370484 A1* | 11/2020 | Yonezawa | ........... | F02D 41/0007 |

FOREIGN PATENT DOCUMENTS

| | | |
|---|---|---|
| JP | 2010-084613 A | 4/2010 |
| JP | 2016-033343 A | 3/2016 |
| JP | 2018-184861 A | 11/2018 |

* cited by examiner

*Primary Examiner* — Joseph J Dallo
(74) *Attorney, Agent, or Firm* — Posz Law Group, PLC

(57) ABSTRACT

An injection control device includes: a conversion coefficient setter setting a conversion coefficient for each injection when a fuel injection valve is driven by an electric current to inject fuel from the fuel injection valve; and an area correction unit calculating an energization time correction amount by performing area correction using the conversion coefficient for each injection regardless of whether a drive current of the fuel injection valve has reached a target peak current or not.

12 Claims, 9 Drawing Sheets

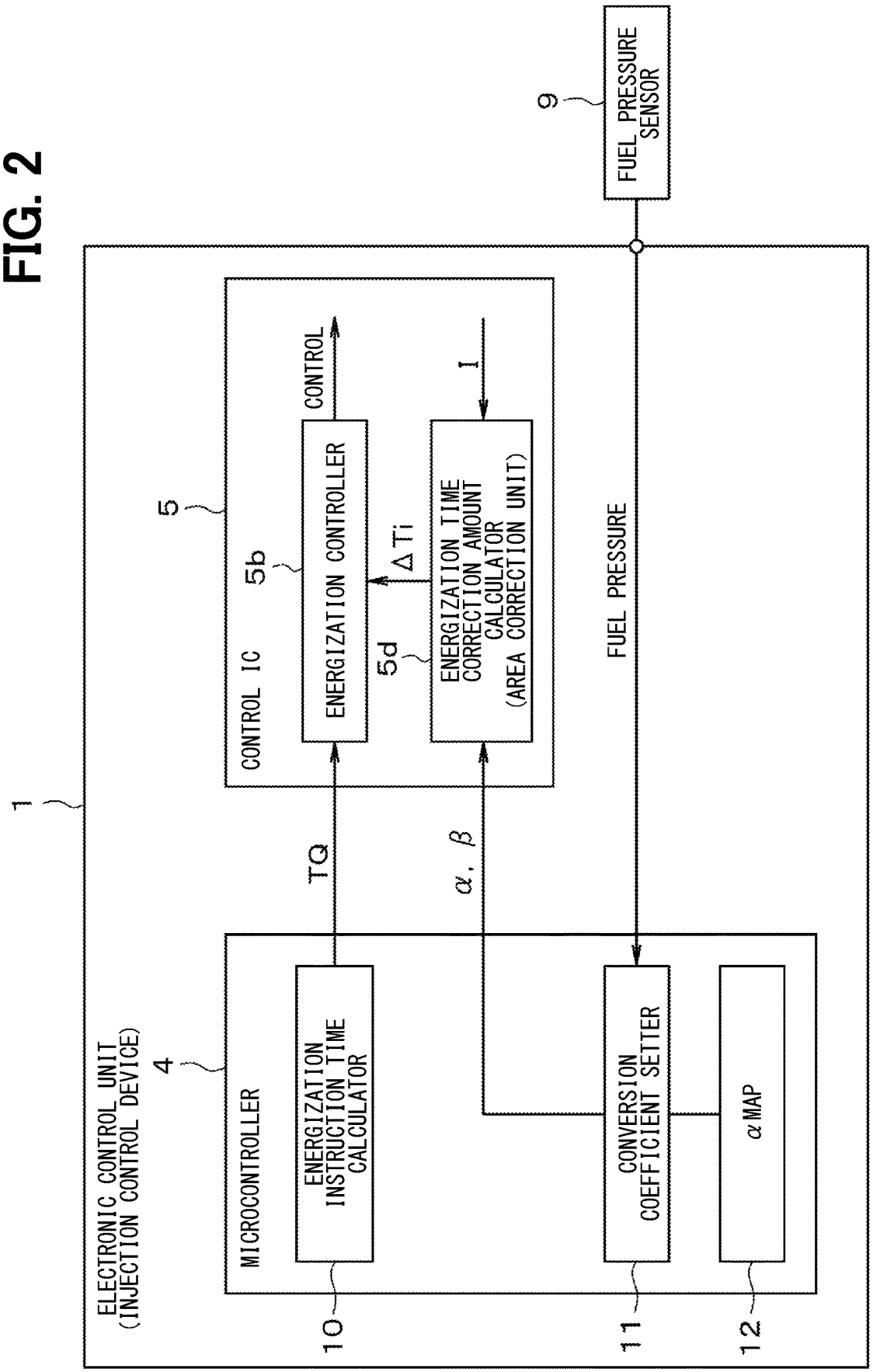

FIG. 3

α MAP 12

ENERGIZATION TIME

|  | T1 | T2 | T3 | T4 | T5 | T6 | T7 | T8 |
|---|---|---|---|---|---|---|---|---|
| P1 | $\alpha 11$ | $\alpha 12$ | $\alpha 13$ | $\alpha 14$ | $\alpha 15$ | $\alpha 16$ | $\alpha 17$ | $\alpha 18$ |
| P2 | $\alpha 21$ | $\alpha 22$ | $\alpha 23$ | $\alpha 24$ | $\alpha 25$ | $\alpha 26$ | $\alpha 27$ | $\alpha 28$ |
| P3 | $\alpha 31$ | $\alpha 32$ | $\alpha 33$ | $\alpha 34$ | $\alpha 35$ | $\alpha 36$ | $\alpha 37$ | $\alpha 38$ |
| P4 | $\alpha 41$ | $\alpha 42$ | $\alpha 43$ | $\alpha 44$ | $\alpha 45$ | $\alpha 46$ | $\alpha 47$ | $\alpha 48$ |
| P5 | $\alpha 51$ | $\alpha 52$ | $\alpha 53$ | $\alpha 54$ | $\alpha 55$ | $\alpha 56$ | $\alpha 57$ | $\alpha 58$ |
| P6 | $\alpha 61$ | $\alpha 62$ | $\alpha 63$ | $\alpha 64$ | $\alpha 65$ | $\alpha 66$ | $\alpha 67$ | $\alpha 68$ |

FUEL PRESSURE (row labels P1–P6)

FIG. 8

α MAP 12a (NORMAL)

ENERGIZATION INSTRUCTION TIME

| FUEL PRESSURE | | T1 | T2 | T5 |
|---|---|---|---|---|
| | P1 | α11 | α12 | α15 |
| | P3 | α31 | α32 | α35 |
| | P6 | α61 | α62 | α65 |

FIG. 9

α MAP 12b (STEP REGION)

ENERGIZATION INSTRUCTION TIME

| FUEL PRESSURE | | T4a | T4b | T4c | T4d | T5 |
|---|---|---|---|---|---|---|
| | P1 | α14a | α14b | α14c | α14d | α15 |
| | P3 | α34a | α34b | α34c | α34d | α35 |
| | P4 | α44a | α44b | α44c | α44d | α45 |
| | P5 | α54a | α54b | α54c | α54d | α55 |
| | P6 | α64a | α64b | α64c | α64d | α65 |

INJECTION CONTROL DEVICE

CROSS REFERENCE TO RELATED APPLICATION

The present application is based on and claims the benefit of priority of Japanese Patent Application No. 2020-093308, filed on May 28, 2020, the disclosure of which is incorporated herein by reference.

TECHNICAL FIELD

The present disclosure generally relates to an injection control device that controls valve opening/closing of a fuel injection valve.

BACKGROUND INFORMATION

The injection control device is used to inject fuel into an internal combustion engine by opening and closing a fuel injection valve. The injection control device controls valve opening by energizing an electrically driveable fuel injection valve with an electric current. In recent years, an ideal current profile of an energization current based on an instruction injection amount has been defined, and an injection control device controls valve opening by applying an electric current to a fuel injection valve based on the ideal current profile.

SUMMARY

It is an object of the present disclosure to provide an injection control device capable of performing injection control without steeply changing an injection amount with respect to a small change in the energization instruction time.

BRIEF DESCRIPTION OF THE DRAWINGS

Objects, features, and advantages of the present disclosure will become more apparent from the following detailed description made with reference to the accompanying drawings, in which:

FIG. 2 is an explanatory diagram of information communicated between a microcontroller and a control IC;

FIG. 3 is an explanatory diagram of a map;

FIG. 8 is an explanatory diagram of a map for a normal region;

FIG. 9 is an explanatory diagram of a map for a step area; and

DETAILED DESCRIPTION

Figure 1:
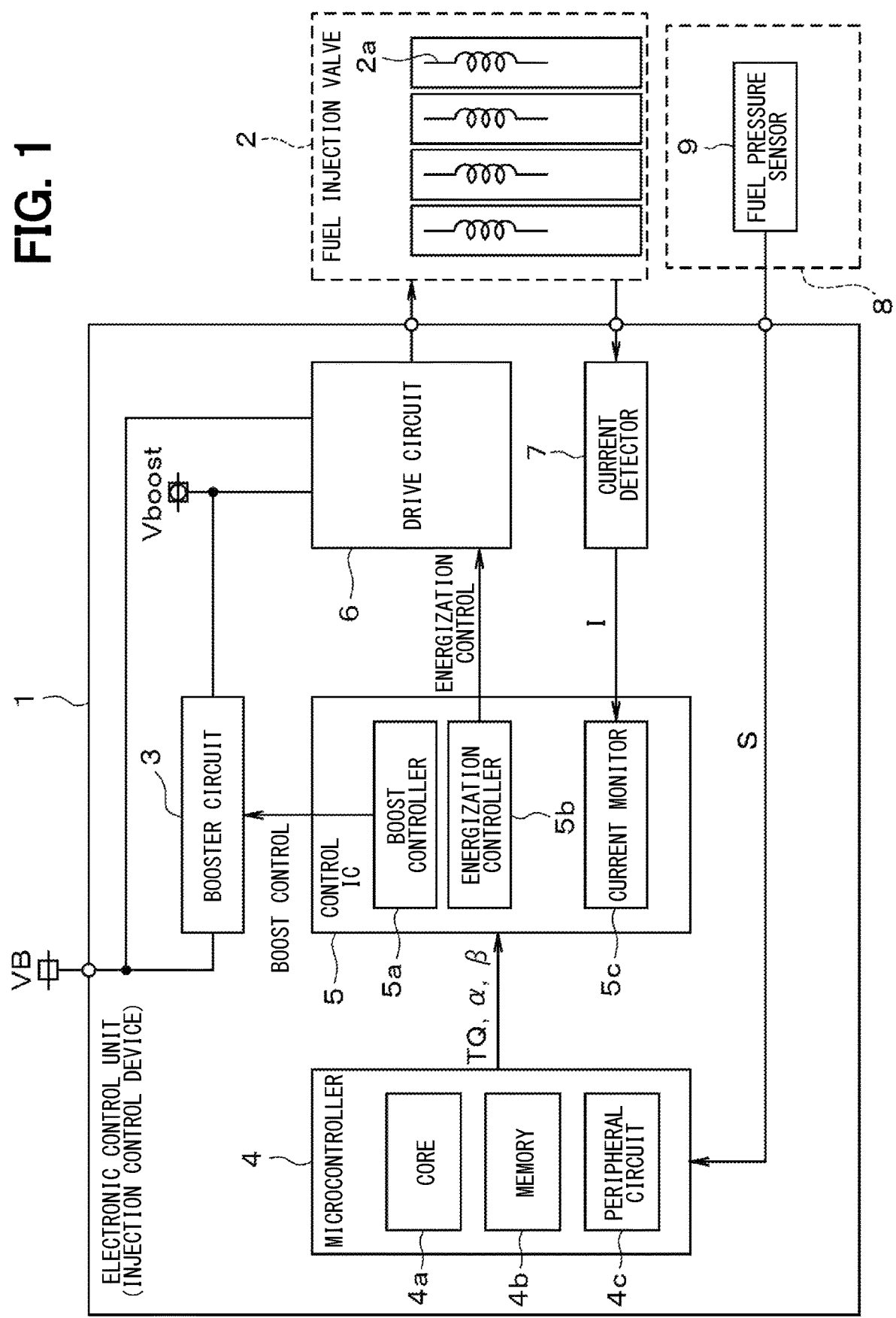
FIG. 1 is an electrical configuration diagram of an injection control device in a first embodiment of the present disclosure.

Hereinafter, embodiments of the present disclosure will be described with reference to the attached drawings. As shown in FIG. 1, an electronic control unit 1 (ECU) is configured as an injection control device that drives and controls a solenoid-type fuel injection valve 2 (also called an injector) which injects and supplies fuel directly to a plurality of cylinders of an internal combustion engine mounted on a vehicle such as an automobile. Here, the fuel injection valve 2 for 4 cylinders is shown, but it is also applicable to 2 cylinders, 3 cylinders, 6 cylinders, and 8 cylinders. Hereinafter, an example of such device applied as the electronic control unit 1 for controlling a gasoline engine will be described, but it may also be applied to an electronic control device for controlling a diesel engine.

The electronic control device 1 includes an electrical configuration as a booster circuit 3, a microcontroller 4, a control IC 5, a drive circuit 6, and a current detector 7, and is used as an injection control device that controls fuel injection. The microcontroller 4 is configured to include one or more cores $4a$, a memory $4b$ such as ROM and RAM, and a peripheral circuit $4c$ such as an A/D converter, and performs various controls based on a program stored in the memory $4b$ and a sensor signal S acquired from various sensors 8.

For example, the sensors 8 for a gasoline engine may include: (i) a crank angle sensor that outputs a pulse signal each time a crank shaft rotates by a predetermined angle, (ii) a water temperature sensor that is arranged in a cylinder block of an internal combustion engine to detect a cooling water temperature, (iii) an intake amount sensor that detects an air intake amount, (iv) a fuel pressure sensor 9 that detects a fuel pressure at the time of fuel injection from the fuel injection valve 2, (v) an A/F sensor that detects the air-fuel ratio of the internal combustion engine, that is, the A/F value, and the like. Further, the microcontroller 4 can acquire the fuel pressure at the time of injecting fuel into the internal combustion engine from the fuel pressure sensor 9 through the peripheral circuit $4c$. FIG. 1 shows the sensors 8 in a simplified manner.

The microcontroller 4 calculates an engine speed (i.e., engine rotation number) from a pulse signal of the crank angle sensor, and acquires an accelerator opening degree from an accelerator signal. The microcontroller 4 calculates a target torque required for the internal combustion engine based on: (i) the accelerator opening degree, (iii) an estimated temperature of the fuel injection valve 2 from the cooling water temperature detected by the water temperature sensor, (iii) a hydraulic pressure, and (iv) the A/F value, and then calculates a required injection amount, which serves as a target injection amount, based on the target torque.

Further, the microcontroller 4 calculates an energization instruction time Ti of an instruction TQ (also known as an injection instruction) based on at least: (i) the required/target injection amount, and (ii) the fuel pressure detected by the fuel pressure sensor 9. The microcontroller 4 calculates an injection instruction timing (such as start time t0 in FIG. 3) for each cylinder based on the sensor signal S input from the various sensors 8 described above, and outputs the instruction TQ for injecting fuel to the control IC 5 at the calculated injection instruction timing.

Note that the microcontroller 4 can calculate an injection start time for each cylinder based at least partly on the engine speed calculated by the pulse signal of the crank angle sensor.

The control IC 5 is, for example, an integrated circuit device using an ASIC, and includes, for example, a logic circuit, a control main body such as a CPU, a storage unit such as a RAM, a ROM, or an EEPROM, and a comparator using a comparator (none of which is shown), configured to perform various controls based on hardware and software. The control IC 5 has functions as a boost controller 5a, an energization controller 5b, and a current monitor 5c.

The booster circuit 3 is composed of a booster type DC/DC converter, and operates by receiving an input of a battery voltage VB. The boost controller 5a boost-controls the battery voltage VB input to the booster circuit 3, and supplies the boost voltage Vboost from the booster circuit 3 to the drive circuit 6.

The drive circuit 6 is configured as receiving an input of the battery voltage VB and the boost voltage Vboost, and injects fuel by driving the fuel injection valve 2 according to energization control by an energization controller 5b of the control IC 5, which applies voltage to a solenoid coil of the fuel injection valve 2 in each cylinder, i.e., by applying the boost voltage Vboost or the boost voltage Vboost or the battery voltage VB.

The current detector 7 is composed of a current detection resistor. The current monitor 5c of the control IC 5 is configured by using, for example, a comparison unit using a comparator, an A/D converter and the like (neither shown), and monitors the electric current flowing through the solenoid coil 2a of the fuel injection valve 2 via the current detector 7.

Further, FIG. 2 schematically shows a part of the functional configurations of the microcontroller 4 and the control IC 5. The microcontroller 4 functions as an energization instruction time calculator 10, and a conversion coefficient setter 11 by executing a program stored in the memory 4b by the core 4a. The control IC 5 also has functions of the boost controller 5a, of the energization controller 5b, and of the current monitor 5c described above, as well as a function of an energization time correction amount calculator 5d serving as an area correction unit.

The energization instruction time calculator 10 calculates the required injection amount at the start of injection control based on the sensor signal S of the various sensors 8 related to the internal combustion engine, and calculates an energization instruction time Ti of the instruction TQ. The energization instruction time Ti of the instruction TQ indicates a duration/length of instruction time for applying a voltage, for example, a boost voltage Vboost to the fuel injection valve 2 during injection control.

The conversion coefficient setter 11 sets correction coefficients $\alpha$ and $\beta$. The correction coefficient $\alpha$ is a coefficient used for estimating an integrated current difference between a normal (or "ideal") current profile PI flowing electric current through the fuel injection valve 2 and an actual energization current EI. The correction coefficient $\alpha$ is a coefficient set to a value of zero or more calculated in advance based on the load characteristics of the fuel injection valve 2, etc., and is recorded in advance in the memory 4b by an $\alpha$ map 12 (see FIG. 3). The $\alpha$ map 12 is a map in which the correction coefficients $\alpha$ are arranged in a matrix. The conversion coefficient setter 11 sets the correction coefficient $\alpha$ with reference to fuel pressure information of the fuel pressure sensor 9 and the $\alpha$ map 12.

As illustrated in FIG. 3, the $\alpha$ map 12 serves as a map for deriving the correction coefficient $\alpha$ from the energization instruction time Ti of the instruction TQ and the fuel pressure detected by the fuel pressure sensor 9 at the time of injection, and the $\alpha$ map 12 is provided for setting the correction coefficient $\alpha$ for a certain range, i.e., from a peak current not yet reached timing to a peak current already reached timing. The correction coefficient $\alpha$ is provided to calculate an energization time correction amount $\Delta$Ti in equations (1) to (4) described later. The conversion coefficient setter 11 can increase the energization time correction amount $\Delta$Ti by setting the correction coefficient $\alpha$ to a large value, or can also set the energization time correction amount $\Delta$Ti to zero by setting the correction coefficient $\alpha$ to zero. Note that times T1 to T8 indicate values that satisfy a relation of T1<T2<...<T8, and fuel pressures P1 to P6 also indicate pressure values that satisfy a relation of P1< P2<...<P6.

In a column of time T1 of the $\alpha$ map 12, correction coefficients $\alpha$11 to $\alpha$61 corresponding to the fuel pressures P1 to P6 are stored. In the column of time T1, the correction coefficients $\alpha$11 to $\alpha$61 are set to increase as the fuel pressures P1 to P6 increase. The correction coefficients $\alpha$12 to $\alpha$62 corresponding to the fuel pressures P1 to P6 are also stored in a column of time T2 of the $\alpha$ map 12. Similarly, in the column of time T2, the correction coefficients $\alpha$12 to $\alpha$62 are set to increase as the fuel pressures P1 to P6 increase.

The correction coefficients $\alpha$13 to $\alpha$63 corresponding to the fuel pressures P1 to P6 are also stored in a column of time T3 of the $\alpha$ map 12. In the column of time T3, the correction coefficients $\alpha$13 to $\alpha$63 are set to increase as the fuel pressures P1 to P6 increase. The correction coefficients $\alpha$14 to $\alpha$64 corresponding to the fuel pressures P1 to P6 are also stored in a column of time T4 of the $\alpha$ map 12. In the column of time T4, the correction coefficients $\alpha$14 to $\alpha$64 are set to increase as the fuel pressures P1 to P6 increase.

The correction coefficients $\alpha$15 to $\alpha$65 corresponding to the fuel pressures P1 to P6 are also stored in a column of time T5 column of the $\alpha$ map 12. In the column of time T5, the correction coefficients $\alpha$15 to $\alpha$65 are set to increase as the fuel pressures P1 to P6 increase. The correction coefficients $\alpha$16 to $\alpha$66 corresponding to the fuel pressures P1 to P6 are also stored in a column of time T6 of the $\alpha$ map 12. In the column of time T6, the correction coefficients $\alpha$15 to $\alpha$66 are set to increase as the fuel pressures P1 to P6 increase.

The correction coefficients $\alpha$17 to $\alpha$67 corresponding to the fuel pressures P1 to P6 are also stored in a column of time T7 of the $\alpha$ map 12. In the column of time T7, the correction coefficients $\alpha$17 to $\alpha$67 are set to be equal even if the fuel pressures P1 to P6 increase. The correction coefficients $\alpha$18 to $\alpha$68 corresponding to the fuel pressures P1 to P6 are stored in a column of time T8 of the $\alpha$ map 12. The energizing time to reach (i.e., achieve) the target peak current during the partial lift injection is set between time T7 and time T8. However, the correction coefficients $\alpha$18 to $\alpha$68 for time T8 are all set to zero corresponding to all of the fuel pressure P1 to P6.

In one embodiment of the $\alpha$ map 12 in FIG. 3, there are 3 general cases:
  case (i) the correction coefficient $\alpha$ increases as the fuel pressure increases in columns T1 to T6;
  case (ii) the correction coefficient $\alpha$ remains constant as the fuel pressure increases in column T7; and
  case (iii) the correction coefficient $\alpha$ remains zero as the fuel pressure increases in column T8.

For example, if the energization time of the fuel injection valve 2 is about time T8, for a guarantee that the target peak current Ipk is always reached (i.e., achieved) during the partial lift injection, it is configured that the energization time correction amount $\Delta$Ti, i.e., an extension of time ($\Delta$Ti), calculated by multiplying one of the correction coefficients $\alpha$18 to $\alpha$68 always results in zero. Although a simplified example has been described here, the correction coefficient $\alpha$ is recorded in the $\alpha$ map 12 corresponding to all the energization times that can be set.

In FIG. 3, the correction coefficient β is a coefficient used for estimating an estimated peak current value Ipa1 of the injection control, and is a coefficient calculated in advance based on the load characteristics of the fuel injection valve 2 and the like. In one embodiment, the correction coefficient β is an intercept of the vertical axis and has a negative value.

The energization controller 5b of the control IC 5 inputs the energization instruction time Ti of the instruction TQ, and the energization time correction amount calculator 5d inputs the correction coefficients α and β. When the energization instruction time Ti of the instruction TQ is input, the energization controller 5b of the control IC 5 performs energization control for supplying electric power from the drive circuit 6 to the fuel injection valve 2 (for example, for supplying the boost voltage Vboost). On the other hand, when the fuel injection valve 2 is driven with electric current by the energization controller 5b to inject fuel therefrom, the energization time correction amount calculator 5d of the control IC 5 calculates the energization time correction amount ΔTi by acquiring the electric current flowing through the fuel injection valve 2 and by performing area correction of the electric current.

When the energization time correction amount calculator 5d calculates the energization time correction amount ΔTi, the energization time correction amount calculator 5d feeds it back to the energization controller 5b. The energization controller 5b performs energization control of the fuel injection valve 2 by reflecting the energization time correction amount ΔTi in real time to the energization instruction time Ti of the instruction TQ that is input corresponding to a certain injection.

Hereinafter, details of operation in case of multi-stage in-cylinder injection from the fuel injection valve 2 will be described. In the partial lift injection, an injection process of closing the fuel injection valve 2 before completely opening the valve 2 is performed.

When the battery voltage VB is applied to the electronic control device 1, the microcontroller 4 and the control IC 5 are activated. The boost controller 5a of the control IC 5 boosts the output voltage of the booster circuit 3 by outputting a boost control pulse to the booster circuit 3. The boost voltage Vboost is charged up to a full charge voltage Vfull that exceeds the battery voltage VB.

The microcontroller 4 calculates the required injection amount by the energization instruction time calculator 10 at the start of energization of peak current control, i.e., at on-timing t0 of when outputting the energization instruction, and simultaneously calculates the energization instruction time Ti of the instruction TQ, and outputs the calculation results to the energization controller 5b of the control IC 5. As a result, the microcontroller 4 instructs the control IC 5 with the energization instruction time Ti of the instruction TQ.

On the other hand, while acquiring, from the fuel pressure sensor 9 of the fuel injection valve 2, the fuel pressure information immediately before on-timing t0 for issuing the energization instruction, the microcontroller 4 refers to the α map 12 to set the correction coefficient α by the conversion coefficient setter 11. Further, the microcontroller 4 outputs the correction coefficients α and β to the energization time correction amount calculator 5d by the conversion coefficient setter 11.

The control IC 5 stores, in an internal memory, the normal current profile PI which is a target current for energizing the fuel injection valve 2, and, based on the normal current profile PI, performs the peak current control to attempt to achieve the target peak current Ipk by applying the boost voltage Vboost to the fuel injection valve 2a under the control of the energization controller 5b.

Figure 4:
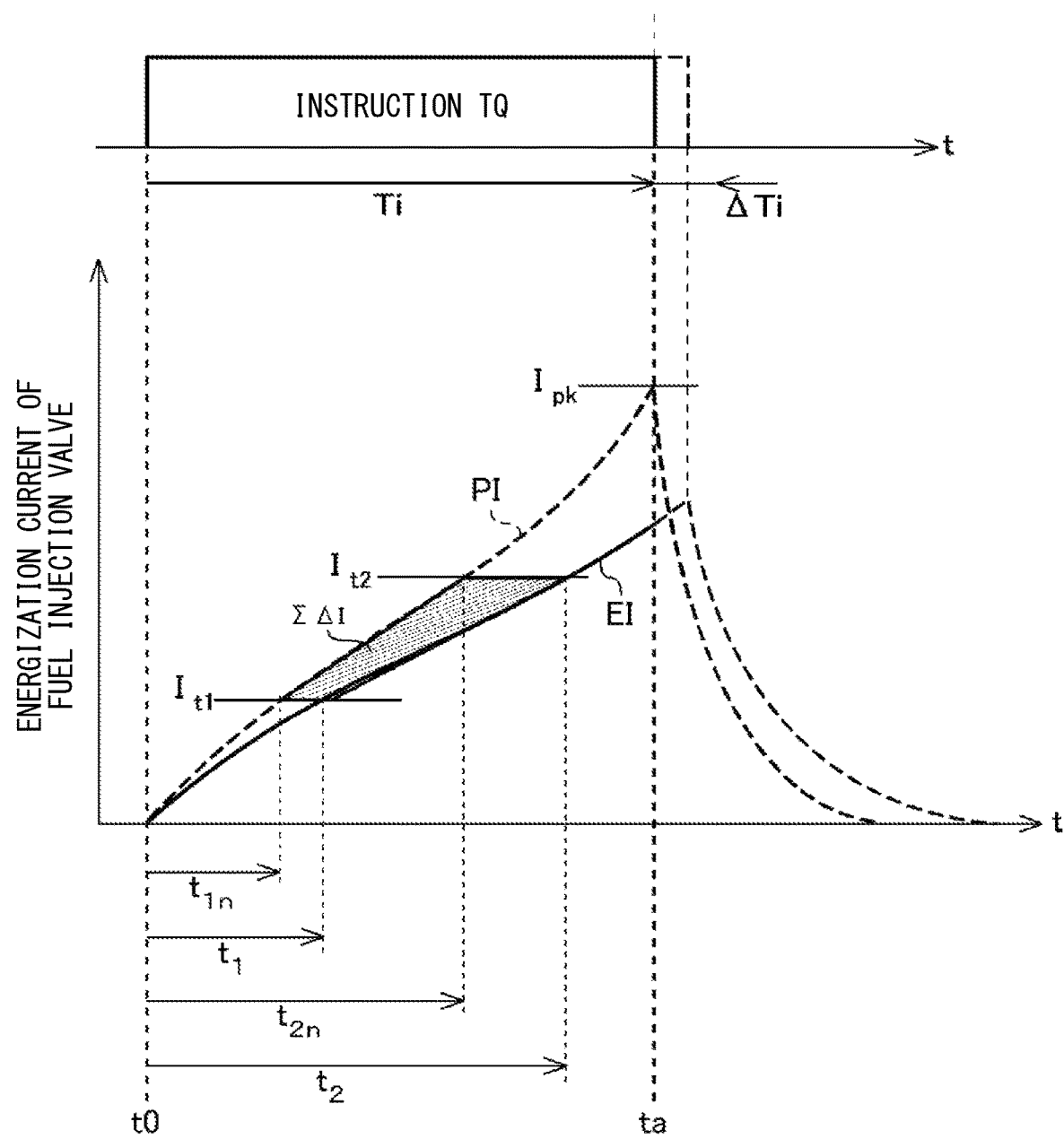
FIG. 4 is an explanatory diagram of a method of calculating an integrated current difference.

The control IC 5 continues to apply the boost voltage Vboost between the terminals of the fuel injection valve 2a until the target peak current Ipk indicated by the normal current profile PI is reached based on the energization instruction time Ti of the instruction TQ. The energization current EI of the fuel injection valve 2a then rises sharply and opens the valve 2. As shown in FIG. 4, the energization current EI of the fuel injection valve 2a changes non-linearly based on the structure of the fuel injection valve 2a.

Figure 10:
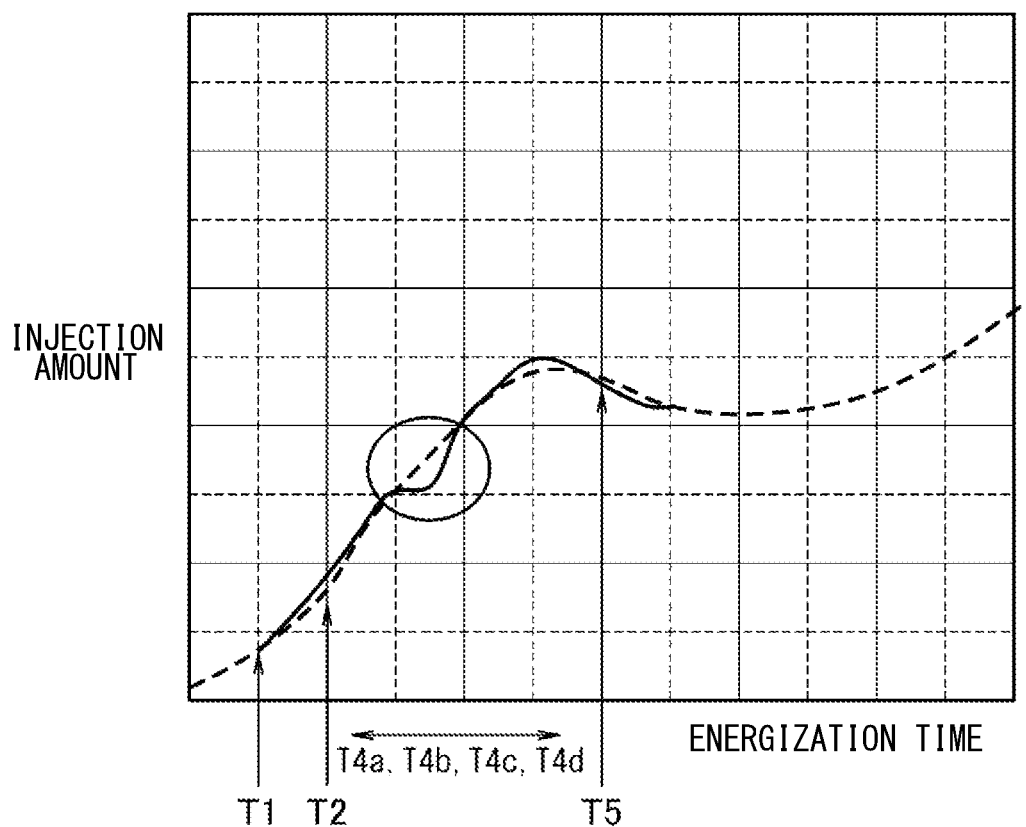
FIG. 10 is an explanatory diagram of a step region of an injection amount.

The energization time correction amount calculator 5d calculates an integrated current difference ΣΔI between the normal current profile PI and the energization current EI that energizes the fuel injection valve 2. Since the integrated current difference ΣΔI is an area surrounded by a non-linear current curve, a calculation load tends to be large for detailed calculation. Therefore, as shown in FIG. 10 and an equation (1), an area size of a trapezoid having (t, I)=(t1n, It1), (t1, It1), (t2n, It2), (t2, It2) as vertices may be calculated for approximation of the integrated current difference ΣΔI. In one embodiment, the calculated trapezoid area is associated with and may be approximately proportional to a difference between the integrated current PI minus the integrated current EI.

(Equation 1)

$$\Sigma\Delta I = \{(t_1-t_{1n})+(t_2-t_{2n})\} \times (I_2-I_1) \div 2 \tag{1}$$

The energization time correction amount calculator 5d calculates the integrated current difference ΣΔI between (i) the normal current profile PI from an ideal reach time t1n reaching a current threshold value It1 to an ideal reach time t2n reaching a current threshold value It2, and (ii) the energization current EI of the fuel injection valve 2 from a reach time t1 actually reaching the current threshold value It1 to a reach time t2 actually reaching a current threshold value It2. In such manner, the energization time correction amount calculator 5d can easily calculate the integrated current difference ΣΔI by detecting the reach times t1 and t2 at which the current threshold values It1 and It2 are reached.

Further, the energization time correction amount calculator 5d calculates a shortage energy Ei (i.e., an amount of energy/electric power insufficiency) by multiplying a correction coefficient α by the integrated current difference ΣΔI as shown in an equation (2). In one embodiment, equation 2 calculates an estimated charge difference between the integrated real/ideal current PI minus the integrated real/measured current EI.

In another embodiment, an estimated charge difference is associated with a true energy difference/shortage, and is proportional to the true energy difference/shortage when the boost voltage is approximately constant. In this case, the correction coefficient α in equation (2) below may have units of energy/charge, or of Joules/Coulombs.

In another embodiment (not shown), a power (current times voltage) may be measured, and a true energy difference/shortage may be more directly calculated.

(Equation 2)

$$Ei = \Sigma\Delta I \times \alpha = \{(t_1-t_{1n})+(t_2-t_{2n})\} \times (I_2-I_1) \div 2 \times \alpha \tag{2}$$

Figure 5:
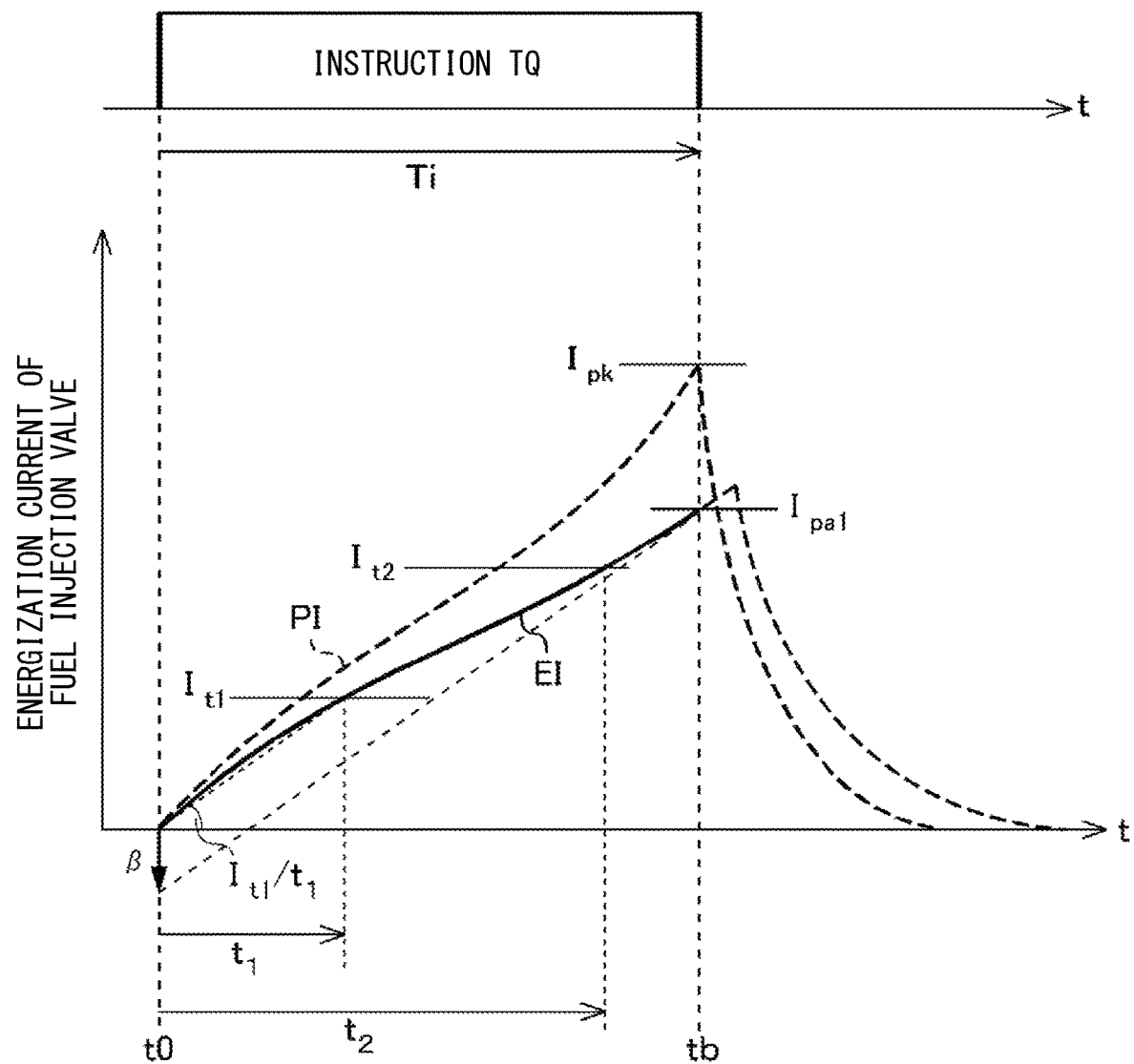
FIG. 5 is an explanatory diagram of a method of calculating an estimated peak current value.

As shown in FIG. 5, the energization time correction amount calculator 5d calculates the current gradient from on-timing t0 of an injection instruction signal to reach time t1 at which the electric current reaches the current threshold value It1, calculates the correction coefficient β as an intercept, and calculates an estimated peak current value Ipa1 at the time when the energization instruction time Ti indicated by the instruction TQ has elapsed from t0. At such timing, the estimated peak current value Ipa1 may preferably be calculated based on an equation (3).

(Equation 3)

$$I_{pa1} = \frac{I_{t1}}{t_1} \times Ti + \beta \quad (3)$$

The correction coefficient β indicates an offset term for accurately estimating the estimated peak current value Ipa1 at an application off timing. Further, here, the current gradient from on-timing t0 of the injection instruction signal to the reach time t1 at which the energization current reaches the current threshold value It1 is used as the first term of the equation (3). However, a current gradient from on-timing t0 of the injection instruction signal to the reach time t2 at which the energization current reaches the current threshold value It2 may also be used as the first term of the equation (3).

In one embodiment, a slope is calculated based on a measured time (t1) at which a first current threshold value It1 is reached. Then an intercept is calculated based on a measured time t2 at which a second current threshold value It2 is reached, and based upon the calculated slope. Using the intercept and the slope, a peak current Ipa1 is estimated at tb (at the end of the instruction TQ). This embodiment assumes that the EI profile is substantially linear (with a constant slope) at an early phase (t0 to t1) and at a late phase (t2 to tb), and may have a curved portion in a center phase (t1 to t2). In FIG. 5, this curved portion causes an non-zero correction coefficient β as an intercept.

Next, the energization time correction amount calculator 5d calculates the energization time correction amount ΔTi for compensating for the shortage energy Ei, as illustrated in FIG. 4. Specifically, as shown in an equation (4), the energization time correction amount calculator 5d calculates the energization time correction amount ΔTi by dividing the calculated shortage energy Ei by the estimated peak current value Ipa1.

(Equation 4)

$$\Delta Ti = Ei \div I_{pa1} = \quad (4)$$

$$\frac{\{(t_1 - t_{1n}) + (t_2 - t_{2n})\} \times (I_2 - I_1) \times \left(\frac{1}{1024 \times 0.03}\right) \div 2 \times \alpha}{\frac{I_{t1}}{t_1} \times \left(\frac{1}{1024 \times 0.03}\right) \times Ti + \beta} =$$

$$\frac{\{(t_1 - t_{1n}) + (t_2 - t_{2n})\} \times (I_2 - I_1) \times \left(\frac{1}{1024 \times 0.03}\right) \times \alpha 2 \times t_1}{\left\{I_{t1} \times \left(\frac{1}{1024 \times 0.03}\right) \times Ti\right\} + \beta \times t_1}$$

The denominator and numerator 1/(1024×0.03) in the equation (4) represent a gain for converting the A/D conversion value of the detection current I into a physical quantity. Further, α2=α/2. By deriving the energization time correction amount ΔTi using the equation (4), which depends on the shortage energy Ei and the estimated peak current value Ipa1 the extension time to compensate for the shortage energy Ei can be easily calculated with dramatically reduced calculation amount.

When the energization time correction amount calculator 5d outputs the calculated energization time correction amount ΔTi to the energization controller 5b, the energization controller 5b corrects the energization instruction time Ti during a period before a timing of when the detected current I detected by the current monitor 5c reaches the estimated peak current value Ipa1, by using the energization instruction calculated value of the instruction TQ+the energization time correction amount ΔTi as the effective energization instruction time of the instruction TQ. As a result, the energization instruction time Ti of the instruction TQ can be easily corrected, and the energization time can be extended. By using such a method, it is not necessary to adjust the energization instruction time Ti in anticipation of variation thereof in order to prevent misfire, and misfire countermeasures can be taken without deteriorating fuel consumption as much as possible.

The energization time correction amount calculator 5d calculates the energization time correction amount ΔTi during a period between the time when the current threshold value It2 is reached and before the timing tb when the estimated peak current value Ipa1 is reached (see FIG. 5). Therefore, the energization instruction time Ti can be corrected with a margin (i.e., well in advance/correction of Ti appropriately performable with sufficient calculation time). Although an example of calculating the energization time correction amount ΔTi based on the equations (1) to (4) is shown, these equations show an example only and the correction method is not limited to such method.

As described above, the correction coefficient α is recorded in the α map 12 corresponding to all the settable energization times, and the energization time correction amount calculator 5d calculates the energization time correction amount ΔTi by constantly/always performing the area correction using the conversion coefficients α and β for each injection regardless of whether or not the drive current of the fuel injection valve 2 reaches the target peak current Ipk. Since the conversion coefficient setter 11 sets the conversion coefficient α each time the area correction is performed, the energization time correction amount calculator 5d can set the energization instruction time correction amount ΔTi in which the conversion coefficient α is changed for each injection.

Figure 6:
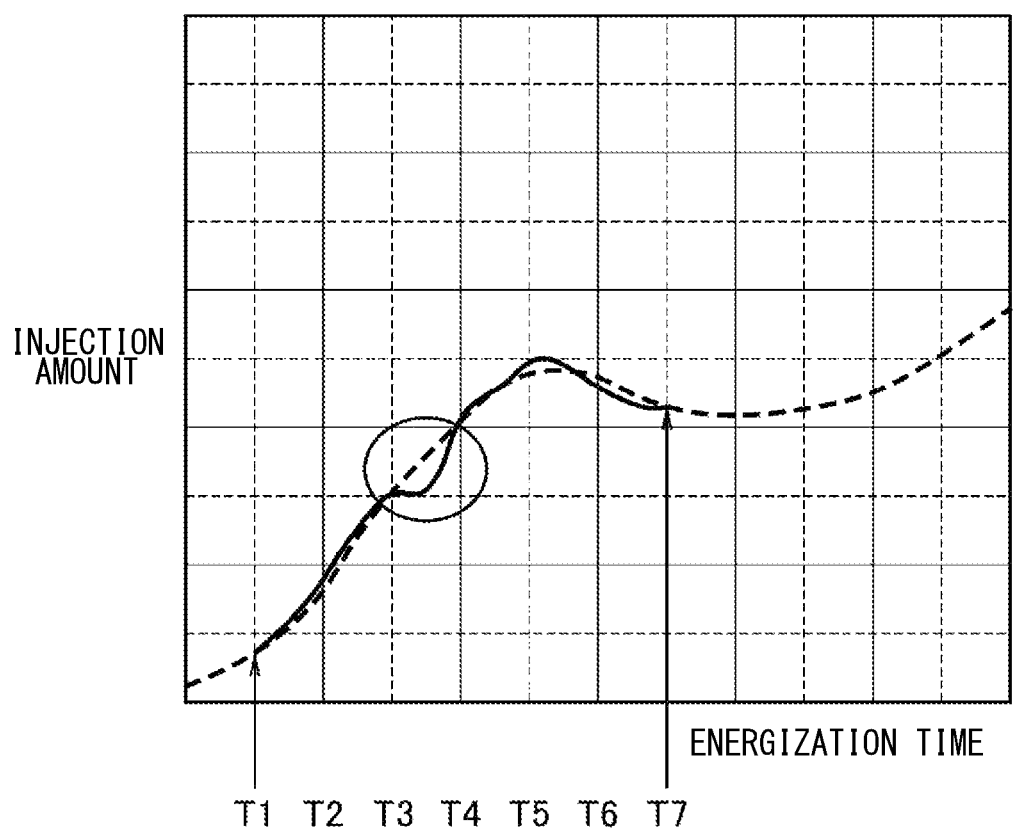
FIG. 6 is an explanatory diagram of a step region of an injection amount.

FIG. 6 schematically shows an example of a change in the injection amount which is under logic control by the control IC 5 with respect to a change in the energization instruction time Ti that is output as an instruction by the microcontroller 4. In FIG. 6, an ideal injection amount is represented by a broken line, and an actual injection amount is represented by a solid line.

As shown in FIG. 6, even if a change in the energization time is continuous, the injection amount does not change smoothly and continuously, i.e., the injection amount is rather changing stepwise. The graph in FIG. 6 shows a stepwise change in the injection amount due to the calculation process of the energization time correction amount ΔTi. That is, whether or not to perform the calculation process of the energization time correction amount ΔTi is changed depending on whether or not the target peak current Ipk is reached for each injection. Therefore, the energization time is corrected by a certain amount, i.e., by the energization time correction amount ΔTi, in one case, and is not corrected in another case, thereby causing a big change in the actual energization time and making a stepwise graph of the injection amount Therefore, in the present embodiment, the conversion coefficient setter 12 sets the conversion coefficient each time the fuel is injected from the fuel injection valve 2, and the energization time correction amount calculator 5d calculates the energization time correction amount ΔTi by performing the area correction using the conversion coefficient α each time the injection is performed regardless of whether or not the drive current of the fuel injection valve 2 has reached the target peak current Ipk.

Regardless of whether the energization current of the fuel injection valve 2 reaches the target peak current Ipk, the control IC 5 constantly performs area correction for each injection, so that the microcontroller 4 appropriately sets the correction coefficient α according to the α map 12, it is possible to eliminate as much as possible a phenomenon that the injection amount steeply/rapidly changes with respect to a minute change in the energization time. As a result, the injection amount can be continuously changed even with a small change in the energization instruction time Ti. In such a control scheme, the A/F value can be controlled to a desired target A/F value. Note that the correction coefficient setter 11 described above sets the correction coefficient α by the α map 12. However, if the correction coefficient α can be converted into a mathematical formula, the α map 12 may be provided as needed.

Second Embodiment

FIGS. 7 to 10 show explanatory views of the second embodiment. The microcontroller 4 stores various information such as a program in the internal memory 4b. Therefore, a constraint condition may be put regarding the storage capacity of the memory 4b, and the number of recorded items of the correction coefficient α of the α map 12 may be limited. In such a case, it may be preferable to switch α maps 12a and 12b between a normal region (hereinafter, the normal region) and a region where the injection amount has a step (hereinafter, referred to as the step region).

The α map 12a as the second map is a map showing the correspondence between (i) the energization instruction time Ti applied to a time region other than the one in which the injection amount has a step and (ii) the conversion coefficient α. The α map 12b as the first map is a map showing the correspondence between the energization instruction time Ti applied to the time region where a step is generated in the injection amount and the conversion coefficient α. FIG. 8 schematically shows the α map 12a used in the normal region, and FIG. 9 schematically shows the α map 12b used in the step region.

As illustrated in FIG. 8, the α map 12a used in the normal region records the correction coefficient α corresponding to the energization times T1, T2, and T5. The energizing times T1 and T2 are times during which the energization current of the fuel injection valve 2 does not reach the target peak current Ipk, as illustrated in FIG. 10. The energization time T5 is a time during which the energization current of the fuel injection valve 2 always/securely reaches the target peak current Ipk. Although shown in a simplified manner here, the α map 12a provides a correction coefficient α corresponding to any normal regions (i.e., exhaustively).

The correction coefficients α11, α31, and α61 corresponding to the fuel pressures P1, P3, and P6 are stored in a time T1 column of the α map 12a. The time T1 column is set so that the correction coefficients α11, α31, and α61 increase as the fuel pressures P1, P3, and P6 increase.

The correction coefficients α12, α32, and α62 corresponding to the fuel pressures P1, P3, and P6 are stored in a time T2 column of the α map 12a. In the column of time T2, the correction coefficients α12, α32, and α62 are set to increase as the fuel pressures P1, P3, and P6 increase.

The correction coefficients α15, α35, and α65 corresponding to the fuel pressures P1, P3, and P6 are stored in a time T5 column of the α map 12a. However, the correction coefficients α15, α35, and α65 for the time T5 column are all set to zero for the fuel pressures P1, P3, and P6.

In the present embodiment, for example, if the energization time of the fuel injection valve 2 is about time T5, the target peak current Ipk always reaches the target peak current Ipk during the partial lift injection, thereby the energization time correction amount ΔTi calculated by the energization time correction amount calculator 5d using the correction coefficients α15, α35, and α65 is set/configured to result in zero (i.e., the extension of time is set to zero). Here, although a simplified example has been described, the correction coefficient α is recorded in the α map 12a corresponding to all the settable energization times.

In the α map 12b used in the step region, the correction coefficients α corresponding to the energization times T4a to T4d are recorded, for the vicinity of the boundary of whether or not the target peak current Ipk is reached during the partial lift injection. The energizing times T4a to T4d indicate the times when the step region is finely divided as illustrated in FIG. 10. That is, in the step region, the injection amount steeply changes even if the energization time changes by a small amount, so the correction coefficient α is recorded in small steps.

The correction coefficients α14a to α54a, α14b to α54b, α14c to α54c, and α14d to α54d corresponding to the fuel pressures P1 and P3 to P5 are stored in columns of time T4a to time T4d of the α map 12b, respectively. In the columns of time T4a to time T4d, the correction coefficients α14a to α54a, α14b to α54b, α14c to α54c, and α14d to α54d are set to increase as the fuel pressures P1 and P3 to P5 increase.

In the column of time T5 of the α map 12b, the correction coefficients α15 to α55 corresponding to the fuel pressures P1 and P3 to P5 are stored. Zeroes are set in the time T5 column.

Figure 7:
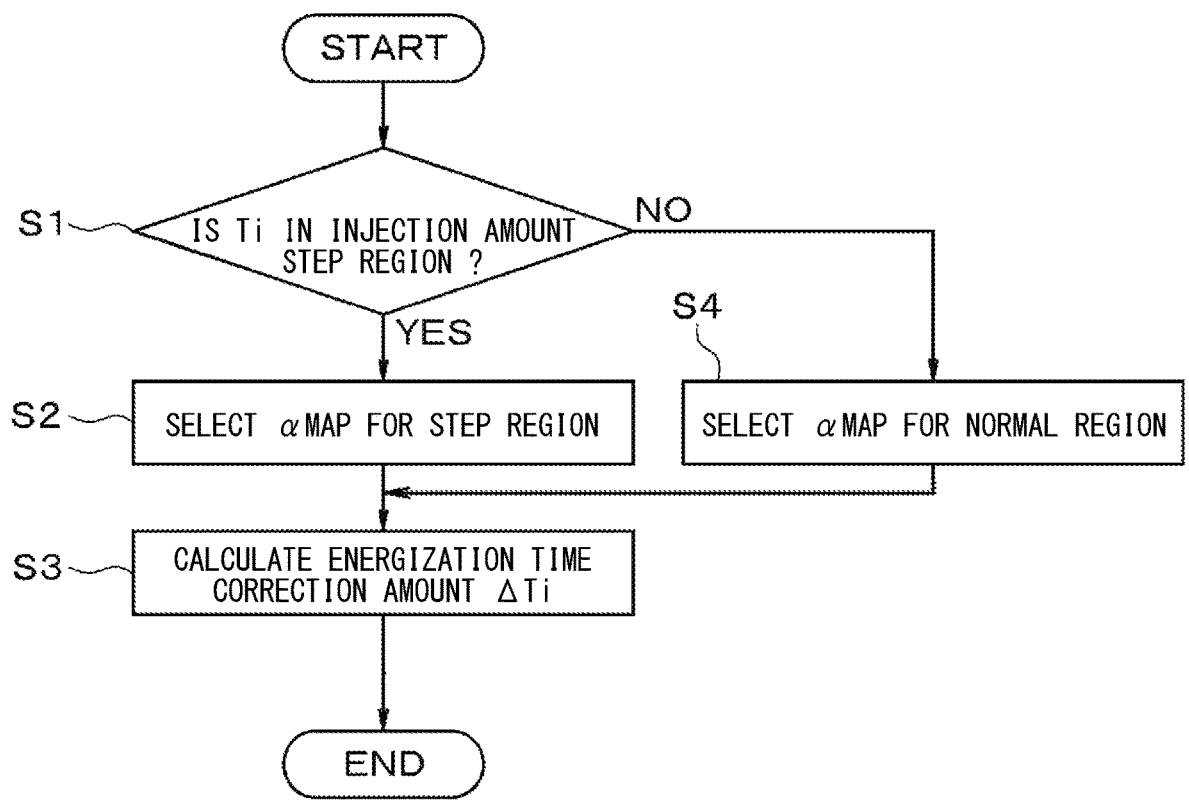
FIG. 7 is a flowchart showing a correction coefficient setting process and an energization time correction amount calculation process in a second embodiment.

As illustrated in FIG. 7, when the energization instruction time Ti of the instruction TQ is calculated by the energization instruction time calculator 10 at the start of injection, the microcontroller 4 determines, in S1, whether or not the energization instruction time Ti is the time in a step region of the injection amount. If the energization instruction time Ti belongs to the step region, the conversion coefficient setter 11 selects the α map 12b for the step region in S2, sets the correction coefficient α, and outputs the selection/setting result to the energization time correction amount calculator 5d. Then, the energization time correction amount calculator 5d of the control IC 5 calculates the energization time correction amount ΔTi using the set correction coefficient α.

On the other hand, as a result of determination in S1 regarding whether or not the energization instruction time Ti is the time in the step region of the injection amount, if the energization instruction time Ti belongs to the normal region, the conversion coefficient setter 11 selects the α map 12a for the normal region in S4, sets the correction coefficient α, and outputs the selection/setting result to the energization time correction amount calculator 5d. Then, the energization time correction amount calculator 5d of the control IC 5 calculates the energization time correction amount ΔTi using the set correction coefficient α. Since the operations other than the above are the same as those in the first embodiment, the description thereof is omitted.

According to the present embodiment, the conversion coefficient setter 11 switches the α maps 12a and 12b according to the energization instruction time to set the conversion coefficient α. The matrix (i.e., size) of each of the α maps 12a and 12b used in the normal region and the step region is reducible, and the storage capacity of the memory 4b can thus be reducible. Moreover, the conversion coefficient setter 11 can set the correction coefficient α corresponding to the energization instruction time Ti in a fine-tuned manner by using the α map 12b for the step region, and can improve the accuracy of the injection control amount.

Other Embodiments

The present disclosure should not be limited to the embodiments described above, and various modifications may further be encompassed without departing from the gist of the present disclosure. For example, the following modifications or extensions are possible. The plurality of embodiments described above may be combined as required.

In the above-described embodiments, the present disclosure is applied to an in-cylinder injection that injects fuel directly into the combustion chamber of an internal combustion engine. However, the present disclosure is not limited to such form, and is applicable to well-known port injection that injects fuel in front of (i.e., to an upstream of) an intake valve.

In the above-described embodiments, the integrated current difference $\Sigma\Delta I1$ is simply calculated by calculating the area size of the trapezoid, but the present disclosure is not limited to such form.

The energization current EI of the fuel injection valve 2a changes non-linearly before reaching the peak current Ipk and after reaching the peak current Ipk. Therefore, it may be preferable to calculate the integrated current difference by approximating the integrated current using a polygon such as a triangle, a rectangle, or a trapezoid. Such an approximation can dramatically reduce the amount of calculation.

Although the embodiment in which the microcontroller 4 and the control IC 5 are configured/implemented as separate integrated circuits has been described, they may be integrally configured/implemented. In case of having an integrated configuration, it may be preferable to use an arithmetic processor or the like capable of high-speed processing/calculation.

The means and/or functions provided by the microcontroller 4 and the control IC 5 can be provided by software recorded in a substantive memory device and a computer that executes the software, or by software, or by hardware, or by a combination thereof. For example, when a control device is provided by an electronic circuit that is hardware, it can be configured by a digital circuit or an analog circuit including one or more logic circuits. Further, for example, when the control device executes various controls by software, a program is stored in a storage unit, and a control entity executing the program implements a method corresponding to the program.

Embodiments described above may be combined to implement the control of the present disclosure. In addition, the reference numerals in parentheses described in the claims simply indicate correspondence to the concrete means described in the embodiments, which is an example of the present disclosure. That is, the technical scope of the present disclosure is not necessarily limited thereto. A part of the above-described embodiment may be dispensed/dropped as long as the problem identified in the background is resolvable. In addition, various modifications from the present disclosure in the claims are considered also as an embodiment thereof as long as such modification pertains to the gist of the present disclosure.

Although the present disclosure has been described in accordance with the above-described embodiments, it is understood that the present disclosure is not limited to the embodiments and structures. The present disclosure encompasses various modifications and variations within the scope of equivalents. In addition, various modes/combinations, one or more elements added/subtracted thereto/therefrom, may also be considered as the present disclosure and understood as the technical thought thereof.

What is claimed is:

1. An injection control device comprising:
 a conversion coefficient setter setting a conversion coefficient for each injection when a fuel injection valve is driven by an electric current to inject fuel from the fuel injection valve; and
 an area correction unit calculating an energization time correction amount by performing area correction using the conversion coefficient for each injection regardless of whether a drive current of the fuel injection valve has reached a target peak current or not,
 wherein the area correction is associated with an area between a normal current profile and an actual current profile, wherein the area is a difference between an integration of an ideal current profile during the energization instruction time and an integration of the actual current profile during the energization instruction time.

2. The injection control device of claim 1, wherein
 a first map showing a correspondence between (i) an energization instruction time applied to a time region where a step is generated in an injection amount and (ii) the conversion coefficient, and a second map showing a correspondence between (iii) the energization instruction time applied to a time region other than the time region where the step is generated in the injection amount and (iv) the conversion coefficient are provided, and
 the conversion coefficient setter switches between the first map and the second map according to the energization instruction time to set the conversion coefficient.

3. A device comprising:
 a processor; and
 a non-transitory computer-readable storage medium,
 wherein the device is configured to:
 (i) determine an energization instruction time for a fuel injector based at least partly on at least one of: an accelerator opening degree, an estimated temperature of the fuel injector, a fuel pressure, and an Air/Fuel mixture;
 (ii) estimate an area between a normal current profile and an actual current profile, wherein the area is associated with a difference between an integration of the ideal current profile during the energization instruction time and an integration of the actual current profile during the energization instruction time;
 (iii) determine an area correction coefficient based at least partly on at least one of: the energization instruction time, and the fuel pressure;
 (iv) calculate an energization time correction amount based at least partly on the area and based at least partly on the area correction coefficient; and
 (v) energize the fuel injector during a corrected energization instruction time, wherein the corrected energization instruction time includes the energization instruction time and the energization time correction amount, wherein the determination of the area correction coefficient is associated with the area, wherein the area is a difference between an integration of the normal current profile during the energization instruction time and an integration of the actual current profile during the energization instruction time.

4. The device of claim 3, wherein:
the area correction coefficient is based at least partly on the energization instruction time.

5. The device of claim 3, wherein:
the area correction coefficient is based at least partly on the fuel pressure.

6. The device of claim 3, wherein:
the area correction coefficient is based at least partly on the energization instruction time, and
the area correction coefficient is based at least partly on the fuel pressure.

7. The device of claim 6, wherein the area correction coefficient is determined by a first table, and wherein the first table provides the following values for the area correction coefficient:
a first value when the energization time is in a first time range and the fuel pressure is in a first pressure range;
a second value when the energization time is in the first time range and the fuel pressure is in a second pressure range;
a third value when the energization time is in a second time range and the fuel pressure in in the first pressure range; and
a fourth value when the energization time is in the second time range and the fuel pressure is in the second pressure range.

8. The device of claim 7, wherein:
the second value is greater than the first value, and
the fourth value is greater than the third value.

9. The device of claim 7, wherein the first table provides a first additional value for the area correction coefficient:
a constant non-zero value for all pressure ranges when the energization time is in a third time range.

10. The device of claim 9, wherein the first table provides a second additional value for the area correction coefficient:
a zero value for all pressure ranges when the energization time is in a fourth time range.

11. The device of claim 6, wherein:
the area correction coefficient is determined by a step region table when the energization time is within a step region range, and is determined by a normal region table when the energization time is outside of the step region range.

12. A device comprising:
a processor; and
a non-transitory computer-readable storage medium,
wherein the device is configured to:
(i) determine an energization instruction time for a fuel injector based at least partly on at least one of: an accelerator opening degree, an estimated temperature of the fuel injector, a fuel pressure, and an Air/Fuel mixture;
(ii) estimate an area between a normal current profile and an actual current profile, wherein the area is associated with a difference between an integration of the ideal current profile during the energization instruction time and an integration of the actual current profile during the energization instruction time;
(iii) determine an area correction coefficient based at least partly on at least one of: the energization instruction time, and the fuel pressure;
(iv) calculate an energization time correction amount based at least partly on the area and based at least partly on the area correction coefficient; and
(v) energize the fuel injector during a corrected energization instruction time, wherein the corrected energization instruction time includes the energization instruction time and the energization time correction amount,
wherein calculating the energization time correction amount is further at least partly based on an offset correction coefficient, and
wherein the offset correction coefficient is associated with a slope of the actual current profile, and is associated with an estimated actual peak current at an end of the energization instruction time.

* * * * *